(12) United States Patent
Tian et al.

(10) Patent No.: US 8,199,476 B2
(45) Date of Patent: Jun. 12, 2012

(54) NOTEBOOK COMPUTER

(75) Inventors: Ping Tian, Beijing (CN); Zhifeng Xin, Beijing (CN); Xiaosong Xia, Beijing (CN); Xiangyang Li, Beijing (CN); Fusan Nakamura, Beijing (CN); Hidenori Kinoshita, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 135 days.

(21) Appl. No.: 12/481,977

(22) Filed: Jun. 10, 2009

(65) Prior Publication Data

US 2009/0310292 A1     Dec. 17, 2009

(30) Foreign Application Priority Data

Jun. 11, 2008   (CN) .......................... 2008 1 0114621

(51) Int. Cl.
*G06F 1/16* (2006.01)
(52) U.S. Cl. ......... 361/679.29; 361/679.21; 361/679.28; 312/223.1; 312/223.2; 345/905
(58) Field of Classification Search .............. 361/679.29
See application file for complete search history.

(56) References Cited

U.S. PATENT DOCUMENTS

| | | | | |
|---|---|---|---|---|
| 5,319,582 A * | 6/1994 | Ma | ................................. | 345/169 |
| 5,619,397 A * | 4/1997 | Honda et al. | ............. | 361/679.43 |
| 5,983,073 A * | 11/1999 | Ditzik | .......................... | 455/11.1 |
| 6,028,764 A * | 2/2000 | Richardson et al. | ..... | 361/679.29 |
| 6,317,315 B1 * | 11/2001 | Lee et al. | ................. | 361/679.29 |
| 6,593,859 B1 * | 7/2003 | Watanabe | ....................... | 341/20 |
| 6,781,823 B1 * | 8/2004 | Nyack | ...................... | 361/679.29 |
| 6,989,987 B1 * | 1/2006 | Wilson et al. | ............ | 361/679.02 |
| 7,265,739 B2 * | 9/2007 | Yim | ................................ | 345/82 |
| 7,570,160 B2 * | 8/2009 | Kim et al. | ................... | 340/545.6 |
| 7,599,178 B2 * | 10/2009 | Huang et al. | ............. | 361/679.43 |
| 7,656,652 B2 * | 2/2010 | Moser | ...................... | 361/679.27 |
| 7,787,242 B2 * | 8/2010 | Schwager et al. | ....... | 361/679.28 |
| 2003/0198008 A1 * | 10/2003 | Leapman et al. | ............. | 361/681 |
| 2004/0160734 A1 * | 8/2004 | Yim | ............................... | 361/681 |
| 2006/0061948 A1 * | 3/2006 | Yin | ............................... | 361/683 |
| 2006/0152893 A1 * | 7/2006 | Chen | ............................ | 361/681 |
| 2007/0091552 A1 * | 4/2007 | Liang et al. | ................... | 361/681 |

FOREIGN PATENT DOCUMENTS

| | | |
|---|---|---|
| CN | 1866157 A | 11/2006 |
| CN | 1912796 A | 2/2007 |

* cited by examiner

*Primary Examiner* — Anthony Q Edwards
(74) *Attorney, Agent, or Firm* — Kinney & Lange, P.A.

(57) ABSTRACT

Disclosed is a notebook computer including a display unit and a mainframe unit. The display unit includes: a display screen; a first frame, the display screen is mounted in the first frame; a first circuit module configured to connect with the display screen electrically, wherein the first circuit module is mounted in the first frame; M first connection mechanisms mounted on a side of the first frame. The mainframe unit includes: a second circuit module for processing data interchanged between the display unit and the mainframe unit; a second frame, wherein the second circuit module is mounted in the second frame; M second connection mechanisms mounted on a side of the second frame; wherein the M second connection mechanisms are configured to connect with the M first connection mechanisms in inserting way, and to detach from the M first connection mechanisms in pulling way. The display unit and the mainframe unit according to the present invention can be removed from each other, so that the portability of the notebook computer is enhanced.

14 Claims, 6 Drawing Sheets

NOTEBOOK COMPUTER

BACKGROUND OF THE INVENTION

1. Field of Invention

The present invention relates to the field of computer, more particularly, to a notebook computer.

2. Description of the Related Arts

Since the portability is an important factor for a notebook computer, the global manufacturer seek to make the notebook computer as slimmer and lighter as possible under the prerequisite of ensuring the excellent performance thereof.

It can be seen that people always put the notebook computer on a desk to work, sometimes people may hold the notebook computer walking all around. When the notebook computer is used in the bed, people always support it with his belly or legs. Since the screen and the base of the computer are connected via a shaft, when there is no exterior support, it is difficult to use a single hand to hold the whole notebook computer, as a result, a user can not set another hand free to operate the notebook or make a demonstration with the notebook computer. Therefore, there is an extremely huge demand on a notebook computer with slimmer and simpler structure in a real life.

During the process of realizing the technical solution of the present invention, the inventor of present invention has found that the notebook computers in the prior art at least have following defects in respect to the slim structure:

A notebook computer, after being opened as in normal use, is difficult to be held by one hand. To solve this problem, a notebook computer has been proposed, of which the screen is closed after it is opened to rotate 360 degree, so that the notebook computer takes a shape of a plate while the screen is exposed outside, such that the notebook computer can be held by one hand. However, the weight and the thickness of the notebook computer are not changed; thus, it still needs a large strength to hold.

Though there are lighter notebook computers in the market called "flat panel notebook computers", however, such computers often merely have simple functions; if the notebook computer in the market is powerful and complete in functionality, it usually is heavy; and at the most importance, such notebook computer can not be put on a desk to use like a normal notebook computer.

Further, although functions of the notebook computer are powerful, a lot of them are not used under a portable state.

SUMMARY OF THE INVENTION

Accordingly, the first object of present invention is to provide a notebook computer, of which the screen and the basic system are integrated in a display device, the display device is removable from a mainframe unit so as to improve the portability of the notebook computer.

In order to achieve one aspect of the above objects, the present invention provides a notebook computer, comprising:
a display unit, the display unit comprises:
a display screen;
a first frame, the display screen is mounted in the first frame;
a first circuit module mounted in the first frame and being electrically connected with the display screen;
M first connection mechanisms mounted on a side of the first frame;
a mainframe unit, the mainframe unit comprises:
a second circuit module for processing the data interchanged between the display unit and the mainframe unit;
a second frame, wherein the second circuit module is mounted in the second frame;
M second connection mechanisms mounted on a side of the second frame;
wherein the M second connection mechanisms are configured to connect with the M first connection mechanisms in an inserting way, and to detach from the M first connection mechanisms in a pulling way.

Preferably, each of the first connection mechanism is an elongated recess, each of the second connection mechanism is a sheet structure fitting with the elongated recess, wherein the elongated recess matches with the sheet structure.

Preferably, each of the second connection mechanism is an elongated recess, each of the first connection mechanism is a sheet structure fitting with the elongated recess, wherein the elongated recess matches with the sheet structure.

Preferably, each of the first connection mechanism is realized by a hole provided on a side of the first frame, each of the second connection mechanism is a cylinder structure fitting with the hole, wherein the elongated recess matches with the sheet structure.

Preferably, each of the second connection mechanism is realized by a hole provided on a side of the second frame, each of the first connection mechanism is a cylinder structure fitting with the hole, wherein the elongated recess matches with the sheet structure.

Preferably, the cylinder structure has following detailed configuration: the cross section thereof is circular, square or hexagonal in structure; the cross section of the hole may be circle, square or hexagon.

Preferably, said first frame further comprises a clipping slot; said second frame further comprises a clip fitting with said clipping slot; said second frame further comprises a button and an ejecting mechanism, said button allows the clip to be disengaged from the clipping slot, said ejecting mechanism is used to push away the display unit by a predetermined distance.

Preferably, the notebook computer further comprises a first wireless transmitter receiver device mounted on the display unit; a second wireless transmitter receiver device mounted on the mainframe unit, interchange of data between the display unit and the mainframe unit is achieved through said first and second wireless transmitter receiver device.

Preferably, the notebook computer further comprises:
at least one set of first set of electric connection ports provided on at least one of M first connection mechanisms, said first set of electric connection ports including at least one first electric connection port and being connected with the first circuit module, M is an integer greater or equal to 1;
at least one set of second set of electric ports provided on at least one of the M second connection mechanisms, each set of second set of electric connection ports including at least one second electric connection port and being connected with the second circuit module, M is an integer greater or equal to 1.

Preferably, the at least one set of the first set of the electric connection port is particularly two sets, said two sets of first set of the electric connection ports are provided opposite on at least one of said M first connection mechanisms.

Preferably, the at least one set of second set of electric connection ports is particularly two sets, said two sets of second set of the electric connection ports are provided opposite on at least one of M second connection mechanisms.

The technical effects achieved by the embodiment of present are provided as following:

1). Through the removable assembling of display unit and the base unit being achieved by the first connection mechanism and the second connection mechanism, and the engagement and disengagement therebetween being achieved in a pulling and inserting manner, the portability of the notebook computer according the present invention can be improved.

2). The present invention recombines components of the notebook computer, wherein the screen and the basic system are integrated together to constitute an integrative display unit, and other extended functional components not needed under the portable state are integrated in the base to constitute an integrative base portion, and then the display unit and the base portion can be easily assembled and disassembled.

3). The screen and the system are integrated together, so that it can be used as a flat panel computer and operates normally after being removed from the base portion. It is slim and simple, so that the portability of the notebook computer is extremely improved. Also, it becomes a normal notebook computer and provides complete functions of a notebook computer when the display unit and the base portion are combined together.

DETAILED DESCRIPTION OF PREFERRED EMBODIMENTS

Preferred embodiments of the present invention will be described hereinafter in detail with reference to the attached drawings, wherein the like reference numerals refer to the like elements throughout the specification. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 1:
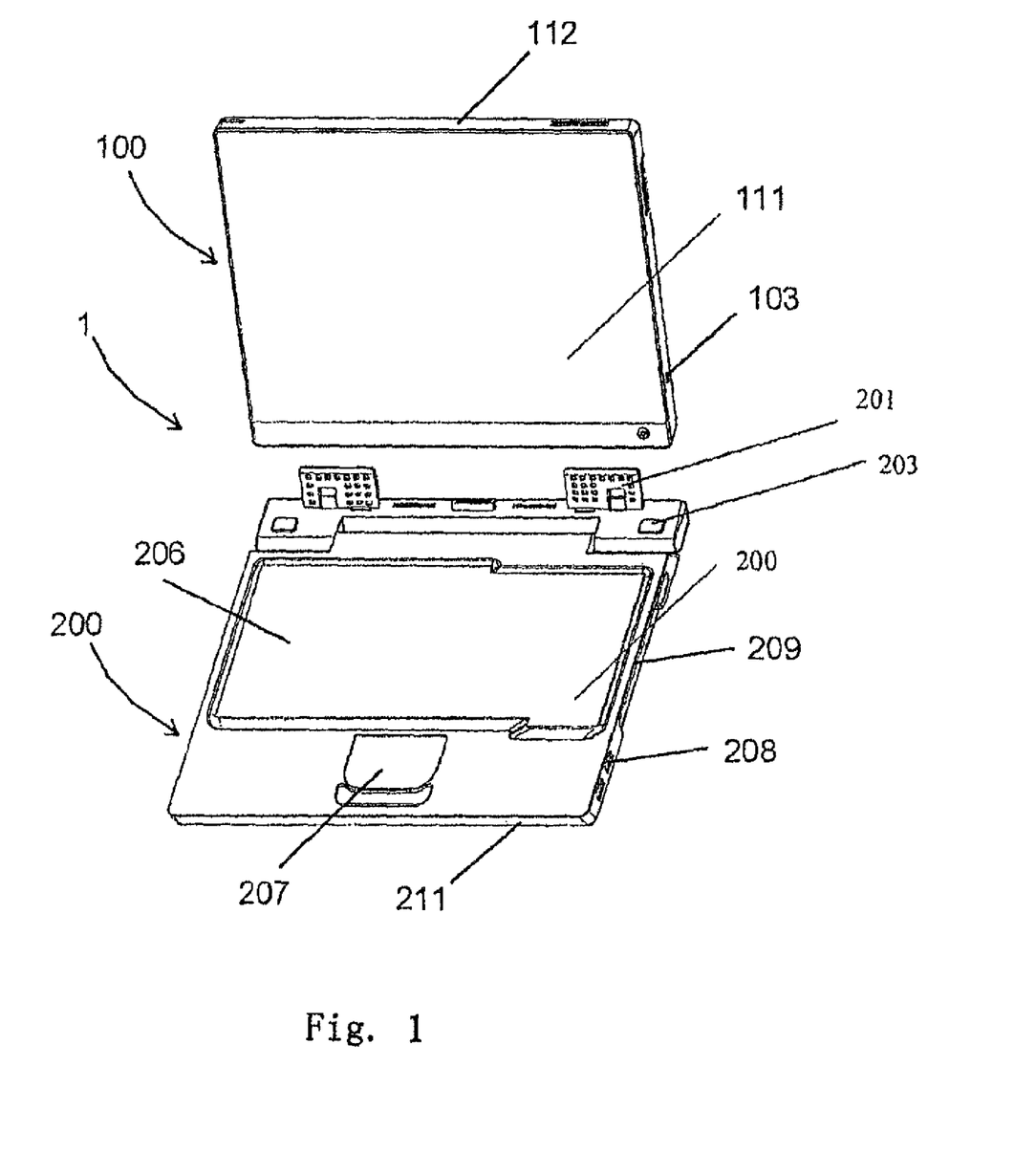
FIG. 1 is a perspective view of a notebook computer under a disassembled state according to an embodiment of the present invention.

An embodiments of the present invention provides a notebook computer, of which a screen and a base are removable, FIG. 1 is a perspective view of a notebook computer under a disassembled state, as shown in drawings, the notebook computer comprises:

a display unit 100, the display unit comprises:
a display screen 111;
a first frame 112 in which the display screen 111 is mounted;
a first circuit module (not shown) mounted in the first frame and being electrically connected with the display screen;
M first connection mechanisms, for example, insertion slot 101, provided on a side of the first frame 112, at least one set of first set of electric connection ports provided on at least one of M first connection mechanisms 101, said first set of electric connection ports including at least one first electric connection port being connected with the first circuit module, M is an integer greater than or equal to 1;
a mainframe unit 200, the mainframe unit includes:
a second circuit module (not shown) for processing the data interchanged between the display unit 100 and the mainframe unit 200;
a second frame in which the second circuit module is mounted;
M second connection mechanisms, for example, inserting piece 201, mounted on a side of the second frame 211, at least one set of second set of electric ports provided on the M second connection mechanisms, each set of second set of electric ports including at least one second electric port connected with the second circuit module;
the M second connection mechanisms 201 are configured to connect with the M first connection mechanisms 101 in an inserting way, and to detach from the M first connection mechanisms in a pulling way.

The way of implementing the first connection mechanisms and the second connection mechanisms includes following:

1) Each of the first connection mechanism is an elongated recess 101, each of the second connection mechanism is a sheet structure 201 fitting with the elongated recess, the engagement and the disengagement between the display unit 100 and the mainframe unit 200 is realized through the cooperation between the elongated recess 101 and the sheet structure 201.

2) Alternatively, it is possible that each of the second connection mechanism is an elongated recess, and each of the first connection mechanism is a sheet structure fitting with the elongated recess, the engagement and the disengagement between the display unit 100 and the mainframe unit 200 is realized through the cooperation between the elongated recess and the sheet structure.

3) In another alternative embodiment, each of the first connection mechanism is a hole provided on one side of the first frame, each of the second connection mechanism is a cylinder structure fitting with the hole, the engagement and the disengagement between the display unit and the mainframe unit is realized through the cooperation between the cylinder structure and the hole.

4) Similarly, it is also possible that each of the second connection mechanism is a hole provided on one side of the second frame, each of the first connection mechanism is a cylinder structure fitting with the hole, the engagement and the disengagement between the display unit 100 and the mainframe unit 200 is realized through the cooperation between the cylinder structure and the hole.

In above embodiments, the cylinder structure has following detailed configuration: the cross section thereof is circular, square or hexagonal in structure; the cross section of the hole may be circle, square or hexagon.

Figure 5:
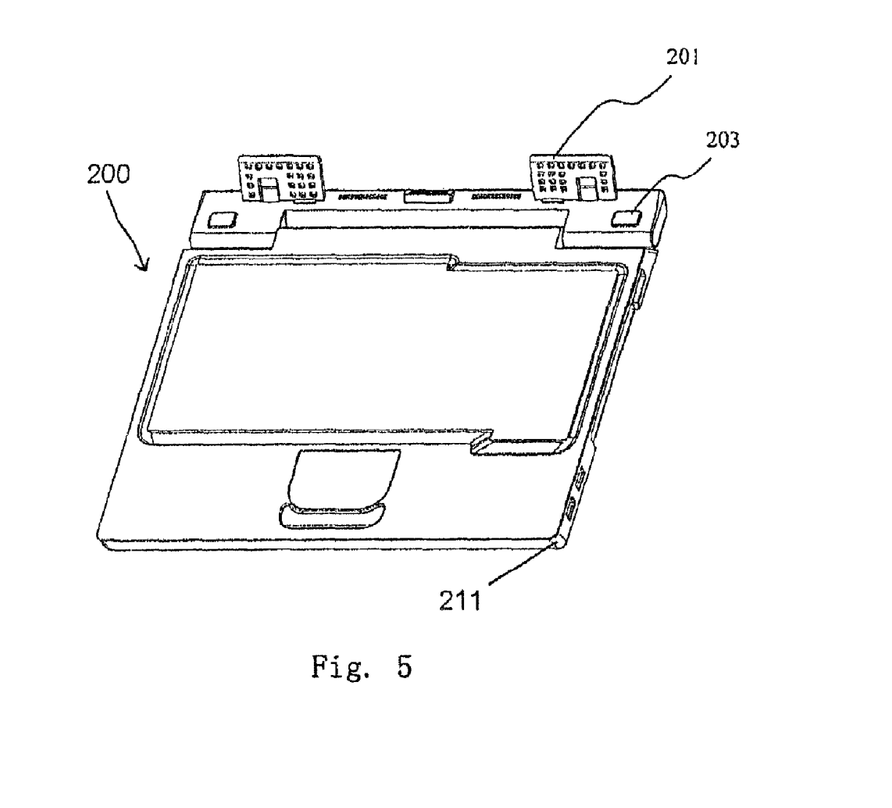
FIG. 5 is a perspective view of the mainframe unit according to the embodiment of the present invention.

Referring to FIGS. 1 and 5, in a prefer embodiment, said at least one set of the first set of the electric connection port is particularly two sets, said two sets of first set of the electric connection ports are provided oppositely and respectively on at least one of said M first connection mechanisms or respectively on frames of the display unit and the base unit and along a side of the display unit. Correspondingly, said at least one set of second set of electric connection ports is two sets, said two sets of second set of the electric connection ports are provided oppositely and respectively on at least one of M second connection mechanisms or respectively on frames of the display unit and the base unit and along a side of the mainframe unit.

In a preferred embodiment, the notebook computer 1 may further comprise a first wireless transmitter receiver device (not shown) mounted on the display unit; a second wireless transmitter receiver device (not shown) mounted on the mainframe unit, interchange of data between the display unit and the mainframe unit are achieved through said first and second wireless transmitter receiver device.

Furthermore, the display unit 100 at least comprises basic hardware supporting the operation system of the notebook computer; the base portion (the mainframe unit) 200 comprises other hardware except those provided in the display unit; the display unit 100 can be detachably connected to the base portion 200, the combination of them forms a normal notebook computer.

Figure 2A:
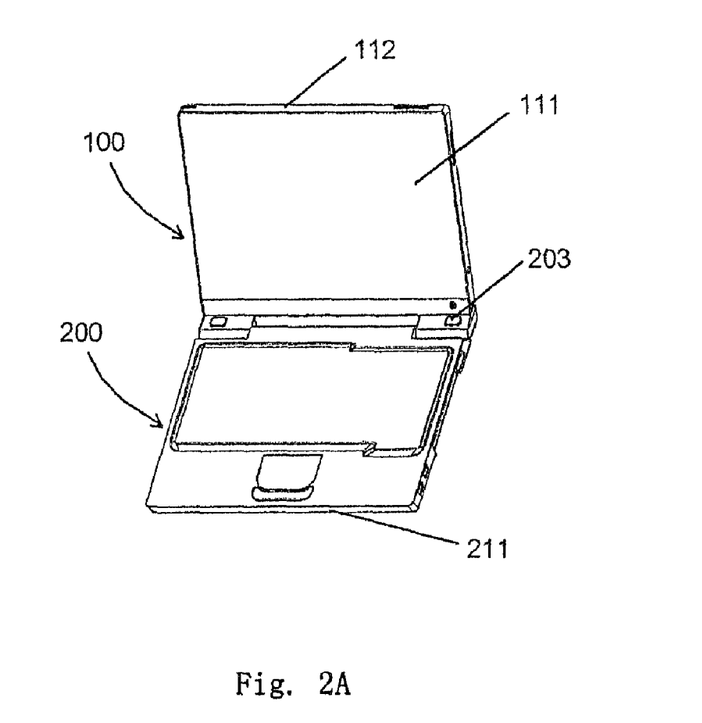
FIGS. 2A, 2B, 2C are a perspective view, a top view and a side view of the notebook computer under an assembled state according to the embodiment of the present invention respectively.
Figure 2B:
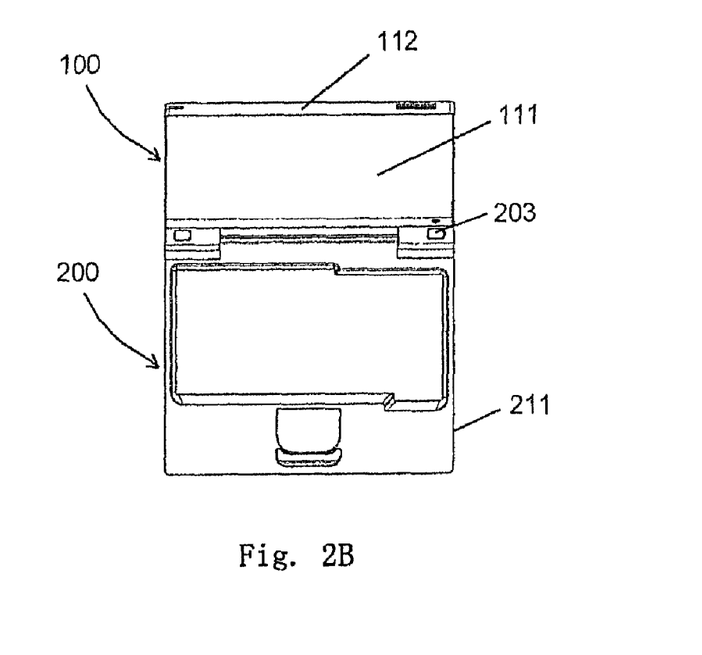
Figure 2C:
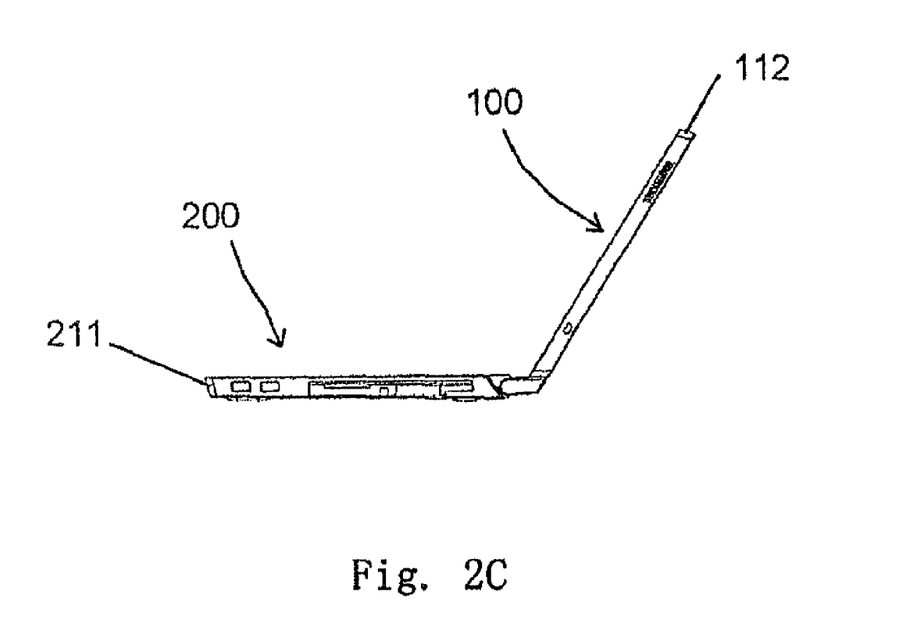
Figure 3:
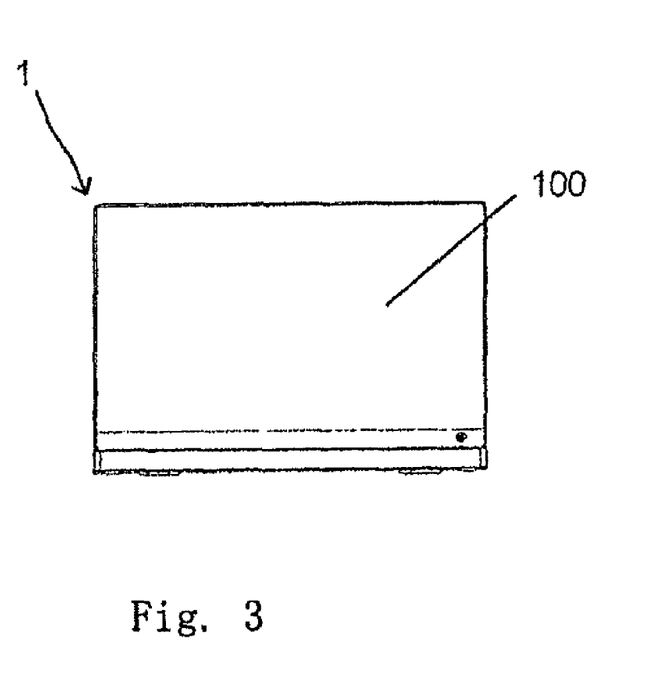
FIG. 3 is a state diagram of the display being closed when notebook computer under the assembled state according to the embodiment of the present invention.

FIGS. 2A, 2B, 2C are a perspective view, a top view and a side view of the notebook computer under an assembled state, FIG. 3 shows the state of the notebook computer under the assembled state with the display being closed, as shown in these drawings, the base portion 200 and the display unit 100 are assembled to form a normal notebook computer, which provides complete computer functions.

Figure 4:
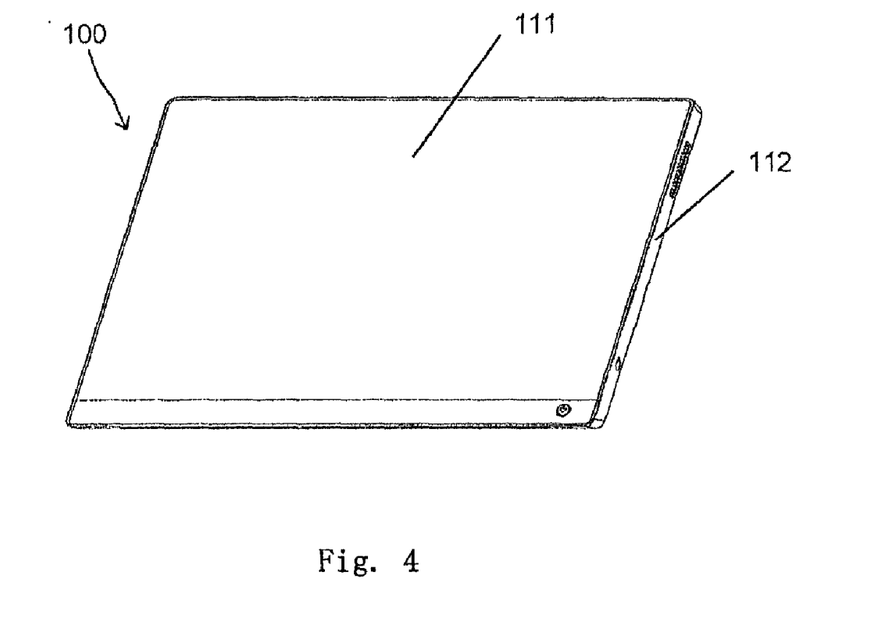
FIG. 4 is a perspective view of the display unit according to the embodiment of the present invention.

FIG. 4 is a perspective view of the display unit of the embodiment in the present invention; basic hardware of the display 100 at least includes: a CPU, a memory, a motherboard, a first battery and a first hard disk (not shown) for installation of an operating system. The LCD display screen 111 is a touch screen being able to perform the information input also can serve as a medium of the information input. Being supported by specific software, the display contents can be switched between a horizontal mode and a vertical mode. The display unit 100 further comprises an earphone interface and USB interfaces 103. Thereby, the display unit 100 is able to run the operating system and to provide basic functions of a notebook computer along, that is, after being disengaged from the base portion 200; also, the display unit 100 is slimmer compared with the normal notebook computer.

FIG. 5 is a perspective view of the base portion of the embodiment in the present invention; the base portion 200 includes following hardware: a keyboard 206, a CD-ROM 209, a second hard disk (not shown), a second battery and a touch panel 207; it also comprises a common larger port 208.

As seen from above, the display unit and the base portion are connected by a removable connection structure. Besides, the signal transmission between the display unit 100 and the base portion 200 may be either a wireless transmission realized by a wireless connection device or a common transmission by wire realized by a connector.

Figure 6:
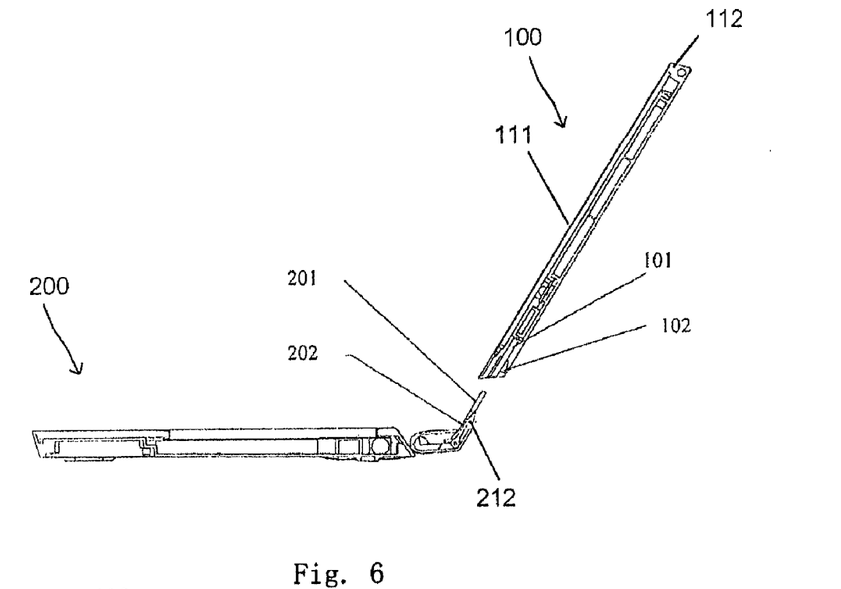
FIG. 6 is a schematic view of a connection structure according to the embodiment of the present invention.

The display unit 100 and the base portion 200 are connected via a removable connection structure. FIG. 6 is a schematic view of an exemplary connection structure according to the embodiment of the present invention. Referring to FIG. 6, the connection structure comprises an insert piece 201 (the second connection structure) and a clip 202 mounted on the base portion 200, an insertion slot 101 (the first connection structure) and a clipping slot 102 mounted on the display unit 100. The insert piece 201 and the clip 202 are mounted on a rotating connection component provided on a side of the second frame 211 (FIG. 5). The insert piece 201 fits with the insertion slot 101, and the clip 202 engages with the clipping slot 102. Referring to FIGS. 1 and 5, the number of the insert piece, the clip, the inserting slot and the clipping slot are two, and they are disposed oppositely and respectively on the display unit 100 and the base portion 200, and along the side of the display unit 100 and the side of the base portion 200, respectively.

Figure 7:
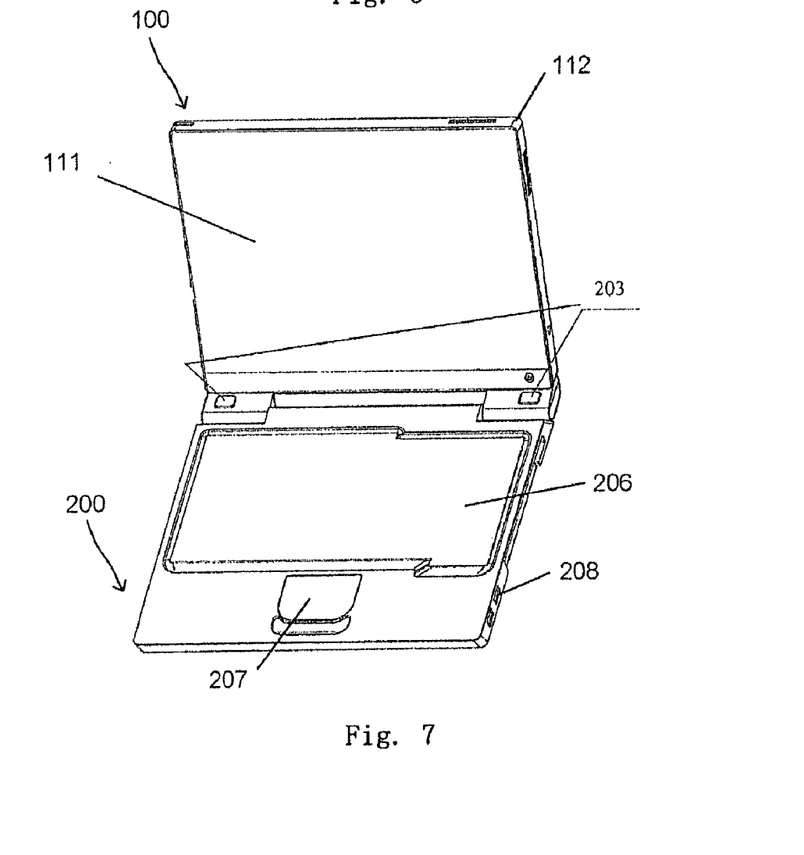
FIG. 7 is a schematic view of a button according to the embodiment of the present invention.

With reference to FIGS. 6-7, the connecting method of the connection structure between the display unit 100 and base portion 200 is described as follows:

The display unit 100 is pressed downward so that the insert piece 201 on the base portion 200 is inserted in the corresponding insertion slot 101, thus, the position of the display unit 100 shown in FIGS. 6-7 in horizontal directions, i.e. the front, rear, left and right directions, is determined. After the display unit 100 reaches to a proper position, the clip 202 on the base portion clips the clipping slot 102 of the display unit, so that the position of the display unit 100 shown in FIGS. 6-7 in vertical directions, i.e. upper and down directions also is established.

Figure 8:
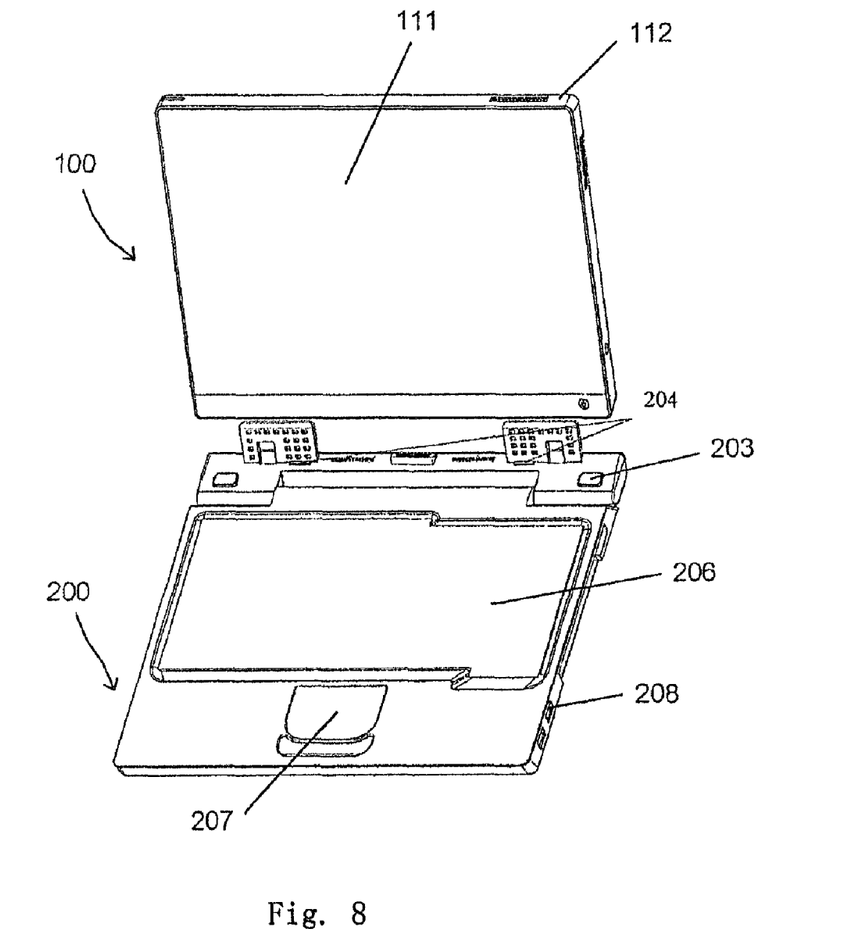
FIG. 8 is a schematic view of an ejecting mechanism according to the embodiment of the present invention.

In a preferred embodiment, the base portion 200 further comprises a button and an ejecting mechanism, FIG. 7 is a schematic view of the button according to the embodiment of the present invention, the button 203 is used for disengaging the clip 202 from the clipping slot 102. FIG. 8 is a schematic view of the ejecting mechanism according to the embodiment of the present invention, the ejecting mechanism 204 is used for pushing away the display unit 100 by a predetermined distance.

The method of disassembling the connection mechanism is provided as following: when the left and right buttons 203 are pressed down, the clip 202 is released so that LCD portion 111 of the display unit 100 is released and automatically ejected out by about 3 mm by the spring 205, and could be taken off. Two buttons 203 (the left and right buttons) are provided for security, which can ensure that the system could only be disengaged by a conscious operation rather than inadvertent touch, so as to avoid the display unit 100 from falling off the base portion and cracking up.

Figure 9:
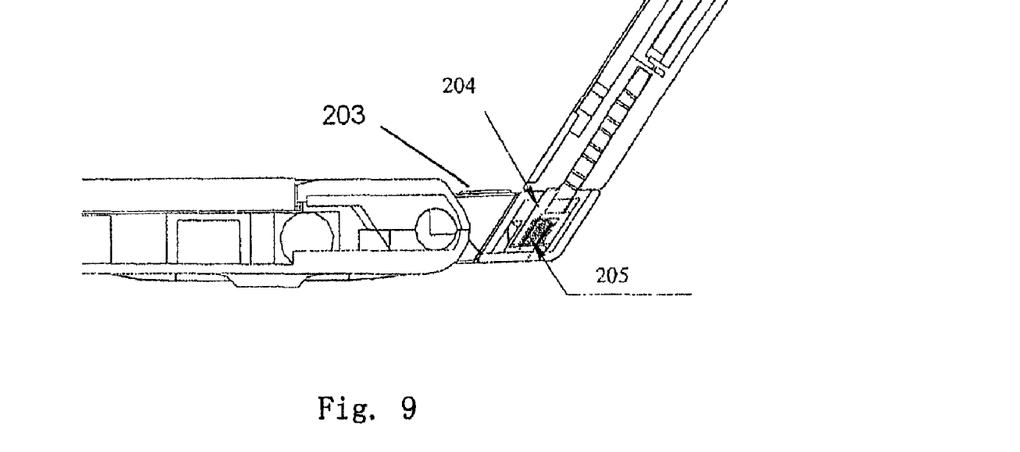
FIG. 9 is a partial enlarged view of the ejecting mechanism according to the embodiment of the present invention.

FIG. 9 is a partial enlarged view of the ejecting mechanism according to the embodiment of the present invention. The ejecting mechanism 204 includes a spring 205, so as to allow the display unit 100 to be automatically released after the button 203 is pressed down, and the display unit 100 would not be blocked again after the button 203 is released. At the same time, since the steps 212 of the clip 202 and the clipping slot 102 requires certain gaps when clipping together, the display unit 100 is not fastened tightly enough and thus be shakable; the ejecting mechanism applies the display unit 100 an upward pre-fastening force, so that the display unit 100 is shake less.

Since the notebook computer according the embodiment of the present allows that the screen thereof has one side be easily disengaged and work independently, two totally different working modes are provided as following:

A: using as a normal notebook computer and being capable of providing all functions like a normal notebook computer;

B: one side of the screen being disengaged so as to use the screen independently. After the side of the screen is removed, the weight and the thickness thereof are much less than the normal notebook computer having similar functions and size, therefore, the portability of the notebook computer is sufficiently used and improved.

As apparent from above, the present invention has following advantages:

1). Through the removable assembling of the display unit and the base unit being achieved by the first connection mechanism and the second connection mechanism, and the engagement and disengagement there between being achieved in a pulling and inserting manner, the portability of the notebook computer according the present invention is improved.

2). The present invention recombines components of the notebook computer, wherein the screen and the basic system are integrated together to constitute an integrative display unit, and other extended functional components unneeded under the portable state are integrated in the base to constitute an integrative base portion, and then the screen and the base portion could be easily assembled and disassembled.

3). The screen and the system are integrated together, the integrated component alone can be used as a flat panel computer and operates normally after being removed from the base portion. It is slim and simple, so that the portability of the notebook computer is extremely improved. On the other hand, it becomes a normal notebook computer and could provide complete functions of a notebook computer when the display unit and the base portion are combined together.

It would be appreciated by those skilled in the art that many modifications, alterations and substitutions may be made in these embodiments without departing from the principles and spirit of the invention, the scope of which is defined in the claims and their equivalents.

What is claimed is:

1. A notebook computer, comprising:
   a display unit, the display unit includes:
      a display screen;
      a first frame in which the display screen is mounted;
      a first circuit module configured to connect with the display screen electrically, wherein the first circuit module is mounted in the first frame; and
      M first connection mechanisms mounted on a side of the first frame;
   a mainframe unit, the mainframe unit includes:
      a second circuit module for processing data interchanged between the display unit and the mainframe unit;
      a second frame, wherein the second circuit module is mounted in the second frame; and
      M second connection mechanisms mounted on a side of the second frame;
   wherein the M second connection mechanisms are configured to connect with the M first connection mechanisms in an inserting way so that the display unit is fixed in horizontal direction, and the M second connection mechanisms are configured to detach from the M first connection mechanisms in a pulling way;
   wherein the first frame further includes a clipping slot;
   the second frame further comprising a clip fitting with said clipping slot, when the M second connection mechanisms connect with the M first connection mechanisms by insertion, the clip clasps the clipping slot so that the display unit is fixed in vertical direction; and
   said second frame further comprising a button and an ejecting mechanism, said button allows the clip to be disengaged from the clipping slot, said ejecting mechanism including a spring to push away the display unit by a predetermined distance; the display unit being released automatically upon the pressing down of the button, and when the button is released, the display unit will not be clasped on the mainframe unit for it has been pushed away by the predetermined distance.

2. The notebook computer according to claim 1, wherein each of the first connection mechanisms is an elongated recess, each of the second connection mechanisms is a sheet structure fitting with the elongated recess, the engagement and the disengagement between the display unit and the mainframe unit being realized through cooperation between the elongated recess and the sheet structure.

3. The notebook computer of claim according to claim 2, wherein the clipping stop is provided at a side of the inner wall of the elongated recess; and
   the clip runs parallel with the sheet structure which is above the clip, and the end of the clip is located at the side of the sheet structure; and during the process of connecting the display unit with the mainframe unit through the engagement of the elongated recess and the sheet structure in an inserting way, the upper portion of the sheet structure enters the elongated recess and afterward a side of the inner wall of the elongated recess lies against an inclined surface of the end of the clip at the side of the sheet structure, and as a result, the lower portion of the sheet structure and the clip enter the elongated recess; and when the sheet structure entirely enters the elongated recess, the clip clasps the clipping slot.

4. The notebook computer according to claim 1, wherein each of the second connection mechanisms is an elongated recess, each of the first connection mechanisms is a sheet structure fitting with the elongated recess, the engagement and the disengagement between the display unit and the mainframe unit being realized through cooperation between the elongated recess and the sheet structure.

5. The notebook computer according to claim 1, wherein each of the first connection mechanisms is a hole provided on one side of the first frame, and each of the second connection mechanisms is a cylinder structure fitting with the hole, the engagement and the disengagement between the display unit and the mainframe unit being realized through cooperation between the cylinder structure and the hole.

6. The notebook computer according to claim 5, wherein the cylinder structure has a cross section thereof that is circular, square or hexagonal in structure; and a cross section of the hole is in the shape of a circle, square or hexagon.

7. The notebook computer according to claim 1, wherein each of the second connection mechanisms is a hole provided on a side of the second frame, and each of the first connection mechanisms is a cylinder structure fitting with the hole the engagement and the disengagement between the display unit and the mainframe unit being realized through cooperation between the cylinder structure and the hole.

8. The notebook computer according to claim 7, wherein the cylinder structure has a cross section thereof that is circular, square or hexagonal in structure; and a cross section of the hole is in the shape of a circle, square or hexagon.

9. The notebook computer according to 1, further comprising:
   a first wireless transmitter receiver set, said first wireless transmitter receiver set being mounted on the display unit; and
   a second wireless transmitter receiver set, said second wireless transmitter receiver set being mounted on the mainframe unit, wherein interchange of data between the display unit and the mainframe unit is achieved through said first and second wireless transmitter receiver set.

10. The notebook computer according to claim 1, further comprising:
   at least one set of first electric connection ports provided on at least one of the M first connection mechanisms, said first electric connection ports including at least one first electric connection port connected with the first circuit module, wherein M is an integer greater than or equal to 1; and at least one set of second electric connection ports provided on at least one of the M second connection mechanisms, said second electric connection ports including at least one second electric port connected with the second circuit module, wherein M is an integer greater than or equal to 1.

11. The notebook computer according to claim 10, wherein said at least one set of first electric connection ports is particularly two sets, said two sets of first electric connection ports being provided opposite each other on at least one of said M first connection mechanisms.

12. The notebook computer according to claim 10, wherein said at least one set of second electric connection ports is particularly two sets, said two sets of second electric connection ports are provided opposite each other on at least one of said M second connection mechanisms.

13. The notebook computer according to claim 1, wherein a basic system is integrated in the display unit.

14. The notebook computer according to claim 1, wherein the second frame further comprises a rotating connection component, the rotating connection component being provided at the same side that the M second connection mechanisms are mounted on, and the M second connection mechanisms are provided on a rotating connection component.

* * * * *